G. A. GASE.
CHECK VALVE.
APPLICATION FILED OCT. 10, 1912.
1,139,455. Patented May 11, 1915.
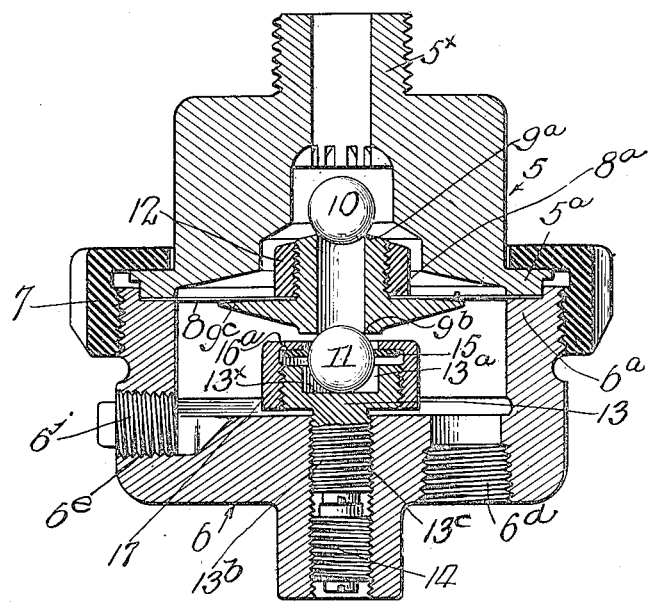
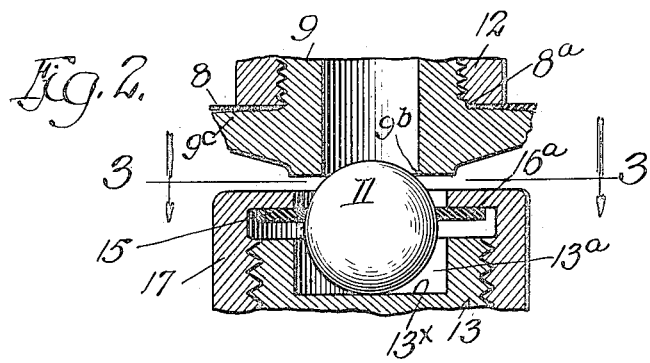
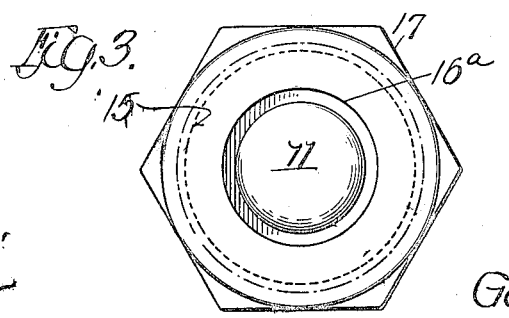
Witnesses:
Inventor
George A. Gase

UNITED STATES PATENT OFFICE.

GEORGE A. GASE, OF CLEVELAND, OHIO, ASSIGNOR, BY MESNE ASSIGNMENTS, TO THE ICELESS MACHINE COMPANY, OF CLEVELAND, OHIO, A CORPORATION OF OHIO.

CHECK-VALVE.

1,139,455.

Specification of Letters Patent.

Patented May 11, 1915.

Application filed October 10, 1912. Serial No. 724,915.

*To all whom it may concern:*

Be it known that I, GEORGE A. GASE, a citizen of the United States, and a resident of Cleveland, in the county of Cuyahoga and State of Ohio, have invented certain new and useful Improvements in Check-Valves; and I do hereby declare that the following is a full, clear, and exact description thereof, reference being had to the accompanying drawings, and to the letters of reference marked thereon, which form a part of this specification.

This invention relates to improvements in check-valves and consists of the matters hereinafter described and more particularly pointed out in the appended claims.

In the drawings:—Figure 1 is a view representing a vertical section through my improved check-valve. Fig. 2 represents a fragmentary detail sectional view on an enlarged scale and will be referred to more particularly as I proceed with my specification. Fig. 3 represents a plan sectional view taken on a plane indicated by line 3—3 of Fig. 2.

Referring now to that embodiment of my invention illustrated in the drawings, the same comprises upper and lower chambered members 5, 6 attached together at their margins by means such as to provide a gas-tight joint. As shown, said members have flanges $5^a$, $6^a$, secured together by means of a union nut 7.

8 indicates a diaphragm made preferably of thin sheet metal, the marginal parts of which are clamped between the flanges of said chambered members. The diaphragm 8 has a central opening $8^a$ in which is secured an apertured valve plug 9. The upper and lower ends of said valve plug are formed to provide valve seats $9^a$, $9^b$, for upper and lower ball-valves 10 and 11, respectively. Said valve-plug, as shown, has a radially extending flange $9^c$ which engages the lower face of the diaphragm 8 and is threaded above the diaphragm to receive a clamping nut 12 which rigidly secures said valve-plug to the diaphragm.

The lower ball-valve 11 is located in a recess $13^a$ in the upper end of a plug 13 which has a threaded stem $13^b$ engaged within a threaded aperture $13^c$ formed in the lower chambered member 6. The lower end of the stem $13^b$ is provided with means for operatively engaging it by a screw-driver or like device inserted upwardly through the aperture $13^c$ so as to rotate it and thus adjust it vertically to vary the vertical position of the lower ball-valve 11 with reference to its seat on the valve-plug 9. An oppositely threaded plug 14 is also preferably provided within the aperture $13^c$ below the stem $13^b$ to lock the plug 13 in the proper adjusted position.

The recess $13^a$ in the plug 13 is larger in diameter than the ball-valve 11 and has a flat base $13^x$ on which said ball-valve is adapted to roll. The ball-valve 11 is embraced by a floating plate 15 having an aperture therein of a diameter smaller than the diameter of the ball. Said floating plate is located above the horizontal plane of the greatest diameter of the ball and acts to retain the ball in the recess $13^a$. The plate 15 is held, as shown, in floating relation in the recess $13^a$ by means of an inwardly extending radial flange $16^a$ formed on a nut 17 threaded upon the plug 13 (as illustrated in Fig. 2). The ball being capable of limited rolling movement on the flat base $13^x$ will be caused to move into a position where it will fit the lower end of the valve plug when said valve plug is depressed upon it. This construction enables the ball to always find a seat against the seat $9^b$ at the lower end of the valve-plug, when said valve-plug is brought into engagement with it.

The lower chambered member 6 is provided with a screw-threaded aperture $6^d$ to receive the threaded end of an inlet pipe (not shown) and is also provided with a draining opening $6^e$ inclosed by a threaded plug $6^j$ which, if the occasion so requires, may be used for the inlet opening while the aperture $6^d$ may be closed by means of a suitable plug. The upper chambered member 5 has a discharge aperture $5^x$ in line with the valve-plug 9 and is provided with an externally threaded boss adapted for connection with a suitable discharge pipe.

In my improved check-valve, the valve plug 9 is normally held from engagement with the lower ball-valve 11 by means of the diaphragm 8, while the upper end of said valve-plug is normally closed by the upper ball-valve 10. It is apparent that fluid may pass from the lower chambered member to the upper chambered member between the ball 11 and its seat at the lower end of the valve-plug 9, through the valve-plug 9 lifting the ball 10 from its seat and passing freely into the discharge passage 5ˣ. If the pressure for any reason becomes greater on the discharge side of the valve than on the inlet side, the ball-valve 10 will automatically gravitate to its seat 9ᵃ thereby closing the aperture in the plug and the pressure building up upon the upper side of the diaphragm will depress the diaphragm and move the apertured plug 9 to bring the seat 9ᵇ at its lower end into engagement with the ball-valve 11, thus positively closing off any possibility of communication between the chambers above and below the diaphragm. When the pressure on the discharge side is reduced to a pressure lower than that on the inlet side again the diaphragm with the apertured plug will move away from the ball-valve 11 thereby opening communication through the valve as before.

The advantages of my improved check-valve construction are as follows: In valves of this general type, including a diaphragm, the valve controlled by the diaphragm is normally closed on its seat, and in order for the fluid to pass from the inlet to the outlet side it must be raised from its seat, thus in practice producing a continuous vibratory movement of the diaphragm. This vibration of the diaphragm causes crystallization, which in time greatly weakens it so that it is easily ruptured. In my improved valve, the valve opening controlled by the diaphragm is normally open, being closed only when the pressure on the outlet side is greater than on the inlet side. The movement of the diaphragm is thus reduced to a minimum, and its tendency to crystallize greatly reduced. In addition, in my improved valve only a slight difference between the pressure on the inlet side and the outlet side is required to produce a flow through the valve, since only the small differential required to raise the ball 10 is necessary, my construction being in this respect greatly superior to a check-valve normally held closed by a spring or diaphragm. The manner in which the lower ball-valve may be vertically adjusted is advantageous in that the adjustment may be made without taking the valve apart.

I claim as my invention:—

1. A check-valve comprising means providing a chamber with inlet and outlet passages, a flexible diaphragm dividing said chamber into inlet and outlet compartments communicating with said passages, a valve plug having an aperture therethrough fixed in an opening in said diaphragm and movable therewith, said valve plug being provided with valve seats at the inlet and outlet ends of the opening therethrough, a movable valve member normally seated upon the outlet end of said valve plug and a second valve member against which the inlet end of said valve plug is adapted to seat when depressed, said last named member being movable to automatically conform to its seat in said valve plug.

2. A check-valve comprising means providing a chamber with inlet and outlet passages, a flexible diaphragm dividing said chamber into inlet and outlet compartments communicating with said passages, a valve plug having an aperture therethrough fixed in an opening in said diaphragm and movable therewith, said valve plug being provided with valve seats at the inlet and outlet ends of the opening therethrough, a movable valve member normally seated upon the outlet end of said valve plug irrespective of its movement, a second valve member against which the inlet end of said valve plug is adapted to seat when depressed being movable to automatically conform to its seat in the valve plug, and means for adjusting the position of said second valve member with reference to its seat.

3. A check valve comprising means providing a chamber with inlet and outlet passages, a flexible diaphragm dividing said chamber into inlet and outlet compartments communicating with said passages, a valve plug having an aperture therethrough fixed in an opening in said diaphragm and movable therewith, said valve plug being provided with valve seats at the inlet and outlet ends of the opening therethrough, a movable valve member normally seated upon the outlet end of said valve plug and a second transversely movable valve member against which the inlet end of said valve plug is adapted to seat when depressed.

4. A check valve comprising means providing a chamber with inlet and outlet passages, a flexible diaphragm dividing said chamber into inlet and outlet compartments communicating with said passages, an apertured valve plug fixed in an opening in said diaphragm and movable therewith, said valve plug being provided with valve seats at its inlet and outlet ends, a ball normally seated upon the outlet end of said valve plug, and a second ball capable of limited horizontal rolling movement against which the inlet end of said valve plug is adapted to seat when depressed.

5. A check-valve comprising a casing having a chamber with inlet and outlet passages, a flexible diaphragm dividing said chamber into inlet and outlet compartments communicating with said passages, a valve plug carried by the diaphragm, movable therewith and having an opening therethrough, a movable valve member closing the outlet end of said opening, and a laterally movable valve member closing the inlet end of said opening when the valve plug is depressed, said last named member having a convex surface extending into the opening whereby it may automatically conform to the same.

6. A check-valve comprising a casing having a chamber with inlet and outlet passages, a flexible diaphragm dividing said chamber into compartments communicating respectively with said passages, a tubular valve plug carried by the diaphragm, and two balls seating in the respective ends of the tubular plug.

In testimony, that I claim the foregoing as my invention I affix my signature in the presence of two witnesses, this 5th day of October A. D. 1912.

GEORGE A. GASE.

Witnesses:
CLARENCE E. MEHLHOPE,
H. H. SOUTHWORTH.